United States Patent Office 2,795,617
Patented June 11, 1957

2,795,617

PREPARATION OF KETONES

Walter Kimel, Highland Park, and Norbert William Sax, Little Falls, N. J., assignors to Hoffmann-La Roche Inc., Nutley, N. J., a corporation of New Jersey No Drawing. Application April 19, 1955, Serial No. 502,526

9 Claims. (Cl. 260—595)

This invention relates to an improved method of making ketones. More particularly, it relates to a process of making unsaturated ketones by decarboxylation of certain esters of acetoacetic acid wherein the decarboxylation is catalyzed by the use of an aluminum tri(lower alkoxide). In particular, the invention relates to a process of making ketones having the formula I 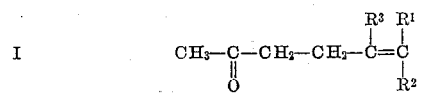

wherein $R^1$ is selected from the group consisting of alkyl and alkenyl radicals,
$R^2$ is a lower alkyl radical, and
$R^3$ is selected from the group consisting of hydrogen and lower alkyl radicals which comprises heating an ester of the formula II 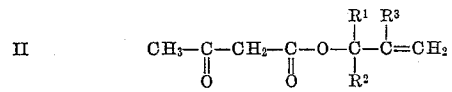

wherein $R^1$, $R^2$ and $R^3$ have the same meanings described above in the presence of an aluminum tri(lower alkoxide) thereby eliminating carbon dioxide from said ester.

Formula I above represents a class of unsaturated ketones which are not generically novel, and no invention is herein claimed in said class of unsaturated ketones, per se. Similarly, Formula II represents a class of esters which are not generically novel; and said esters and the methods of preparing the same are not part of the present invention, which relates solely to a novel method of preparing the ketones of Formula I.

A general procedure for practising the invention comprises adding the aluminum tri(lower alkoxide) catalyst to the ester starting material and heating the mixture, with efficient agitation, to a sufficiently high temperature to cause a steady evolution of carbon dioxide. It is permissible, but not ordinarily necessary nor even desirable, to employ a solvent for the ester, in order to moderate the conditions of reaction, inasmuch as the decarboxylation is an exothermic reaction. Obviously, the solvent selected must be inert under the conditions of decarboxylation; suitable solvents are, for example, decahydronaphthalene, diphenyl ether and the ketone product of the decarboxylation reaction. Completion of the decarboxylation is indicated by cessation of the evolution of carbon dioxide. The reaction mixture can be worked up by various expedients which are conventional per se, the exact procedure depending upon the relative boiling points of the desired ketone product and of the contaminants in the crude reaction mixture. Byproducts usually encountered are the alcohol corresponding to the ester starting material, dehydracetic acid, acetone and the like. Simple fractionation often suffices to separate the ketone from the byproducts and from the decarboxylation catalyst; but where the desired ketone and a contaminant have boiling points in close proximity to each other, the contaminants can be removed by washing with mildly alkaline or mildly acidic reagents.

It is preferred to employ the aluminum tri(lower alkoxide) catalyst in a proportion not less than about 2 millimols per mol of ester starting material; still more preferably, in a proportion of from about 8 millimols per mol of ester starting material to about 25 millimols per mol of ester starting material. Any aluminum tri-(lower alkoxide) can be used as a decarboxylation catalyst, e. g. aluminum tri(ethoxide), aluminum tri-(methoxide), aluminum tri(n-pentoxide), aluminum tri-(n-heptoxide), etc. It is preferred, however, to use an aluminum tri(lower alkoxide) wherein the alkoxide radicals thereof each contain from 2 to 4 carbon atoms, e. g. aluminum tri(ethoxide), aluminum tri(isopropoxide), aluminum tri(n-butoxide), aluminum tri(tert-butoxide), and the like. Particularly preferred is aluminum tri-(isopropoxide).

As indicated above, the symbol $R^1$ in Formulas I and II represents an alkyl radical or an alkenyl radical. By way of illustration but not of limitation, $R^1$ includes: straight and branched chain alkyl radicals, such as methyl, ethyl, isobutyl, n-amyl, 4-methyl-1-pentanyl, n-heptyl, 3,4-dimethyl-1-pentanyl, 4,8-dimethyl-1-nonanyl, and the like; and straight and branched chain alkenyl (including alka(mono)enyl and alka(poly)enyl) radicals such as 3-penten-1-yl, 4-methyl-3-penten-1-yl, 4-methyl-3-hexen-1-yl, 3,4-dimethyl-3-penten-1-yl, 4,6-dimethyl-3-hepten-1-yl, 4,8-dimethyl-3,7-nonadien-1-yl, and the like. Similarly, illustrative but not limitative values of $R^2$ are: methyl, ethyl, isobutyl and the like; and of $R^3$: hydrogen, methyl, ethyl, isobutyl, n-heptyl, and the like. It will thus be apparent that the invention includes the use of various tertiary carbinyl acetoacetates as starting materials. One particularly preferred type of starting material is a (lower alkyl)-alkyl-vinyl-carbinyl acetoacetate, e. g. diethyl-vinyl-carbinyl acetoacetate, methyl-isobutyl-vinyl-carbinyl acetoacetate, methyl-(4,8-dimethyl-1-nonanyl)-vinyl-carbinyl acetoacetate, and the like. Particularly preferred within this aspect of the invention are methyl-(lower alkyl)-vinyl-carbinyl acetoacetates, e. g. dimethyl-vinyl-carbinyl acetoacetate, methyl-ethyl-vinyl-carbinyl acetoacetate. Another preferred type of starting material is a (lower alkyl)-alkenyl-vinyl-carbinyl acetoacetate, e. g. methyl-(4-methyl-3-penten-1-y1)-vinyl-carbinyl acetoacetate, methyl- (4,8- dimethyl- 3,7- nonadien- 1 -y1)-vinyl-carbinyl acetoacetate, and the like.

The invention is further disclosed in the following examples, which are illustrative but not limitative thereof. Temperatures are stated in degrees centigrade, and are uncorrected.

Example 1

A one-liter three-neck flask equipped with a stirrer, thermometer, dropping funnel and reflux condenser, protected by drying tubes, was charged with 172 g. (2.0 mols) of dimethyl-vinyl-carbinol (which can also be designated 2-methyl-3-buten-2-ol), 170 cc. of petroleum ether (B. P. 30–60°), 4 cc. of pyridine and 4 cc. of acetic acid. From the dropping funnel was added, dropwise, during three hours, 184.8 g. (2.2 mols) of diketene, while maintaining a reaction temperature of 25–30° by external cooling. Stirring was continued at that temperature for three hours after addition was complete. Then, the reaction mixture was washed successively with dilute sulfuric acid solution, followed by saturated sodium bicarbonate solution, and finally with water to neutrality. The organic solution was dried with anhydrous calcium sulfate, and the solvent was removed in vacuo. The product, dimethyl-vinyl-carbinyl acetoacetate, was obtained by fractionation in vacuo; B. P. 40–45° (1.5 mm.); $n_D^{25}=1.4370$; yield, 330 g. (97%).

The dimethyl-vinyl-carbinyl acetoacetate (330 g.) was placed in a one-liter, three-neck flask provided with a stirrer, thermometer and reflux condenser connected via a solid carbon dioxide trap at the top to a gas meter. Aluminum tri(isopropoxide) (3.3 g.) was added to the ester, and the mixture was heated by an oil bath to 145°, causing a vigorous evolution of carbon dioxide. Heating was continued at 145–155° until the evolution of gas had ceased. The crude product was then purified by fractional distillation. 6-methyl-5-hepten-2-one was collected at 48–50° (6 mm.); $n_D^{25}=1.4372$; yield, 199.4 g. (81.5% of theory).

*Example 2*

In the same manner as described in Example 1, 350 g. (3.5 mols) of dimethyl-isopropenyl-carbinol (which can also be designated 2,3-dimethyl-3-buten-2-ol) dissolved in 350 cc. of petroleum ether, 7 cc. of pyridine, and 7 cc. of acetic acid, was allowed to react with 323 g. (3.85 mols) of diketene. The product, dimethyl-isopropenyl-carbinyl acetoacetate, was isolated in yield of 593 g. (92% of theory); B. P. 44–46° (1.2 mm.); $n_D^{25}=1.4465$.

The dimethyl-isopropenyl-carbinyl acetoacetate (593 g.) was stirred with 5.5 g. of aluminum tri(isopropoxide), and was heated at 140–145° for 6 hours. Fractional distillation of the crude reaction mixture obtained yielded 5,6-dimethyl-5-hepten-2-one; B. P. 66–69° (9 mm.); $n_D^{25}=1.4481$; yield=329.5 g. (70% of theory).

*Example 3*

By the same method as in Example 1, 370 g. (4.4 mols) of diketene was added to 512.8 g. (4.0 mols) of methyl-isobutyl-vinyl-carbinol and 500 cc. of petroleum ether in the presence of 8 cc. of pyridine and 8 cc. of acetic acid. Washing of the reaction mixture and evaporation of the solvent left 850 g. of methyl-isobutyl-vinyl-carbinyl acetoacetate; $n_D^{25}=1.4448$.

850 g. of methyl-isobutyl-vinyl-carbinyl acetoacetate was heated at 135–150° for 4 hours in the presence of 8.8 g. of aluminum tri(isopropoxide). The reaction mixture was fractionally distilled, yielding 531 g. (79% of theory) of 6,8-dimethyl-5-nonen-2-one, B. P. 57–59° (1 mm.); $n_D^{25}=1.4430$.

*Example 4*

By reaction of 231 g. (2.75 mols) of diketene with 385 g. (2.5 mols) of methyl-(4-methyl-3-penten-1-yl)-vinyl-carbinol (linalool) dissolved in 385 cc. of petroleum ether in the presence of 8 cc. each of pyridine and of acetic acid, there was obtained a quantitative yield (595 g.) of methyl-(4-methyl-3-penten-1-yl)-vinyl-carbinyl acetoacetate as a light yellow oil; $n_D^{25}=1.4630$. (Purification by distillation was not essential for the next step.)

The above ester (595 g.) was heated in the presence of 4.7 g. of aluminum tri(isopropoxide) for 5 hours at 160–165°. The product, 6,10-dimethyl-5,9-hendecadien-2-one, was isolated by fractional distillation of the reaction mixture; B. P. 72–75° (0.3 mm.); $n_D^{25}=1.4650$; yield, 373.5 g. (77% of theory).

*Example 5*

The reaction of 231 g. (2.75 mols) of diketene with 565 g. (2.5 mols) of methyl-(4,8-dimethyl-1-nonanyl)-vinyl-carbinol (tetrahydronerolidol) dissolved in 565 cc. of petroleum ether, 8 cc. of pyridine and 8 cc. of acetic acid, in the manner described in Example 1, produced 775 g. of methyl-(4,8-dimethyl-1-nonanyl)-vinyl-carbinyl acetoacetate; $n_D^{25}=1.4539$.

The above ester (775 g.) was heated with 7.5 g. of aluminum tri(isopropoxide) to 158–165° for 2 hours, when the evolution of carbon dioxide had ceased. The crude reaction product was dissolved in an equal volume of petroleum ether, and was washed with dilute sulfuric acid, saturated sodium bicarbonate, and finally with water until neutral. The organic portion was dried with anhydrous calcium sulfate, and after removal of solvent in vacuo, the residue was purified by fractional distillation. 6,10,14-trimethyl-5-pentadecen-2-one was obtained at 110–112° (0.4 mm.); $n_D^{25}=1.4540$; yield, 512 g. (77% of theory).

*Example 6*

340 g. of dimethyl-vinyl-carbinyl acetoacetate, prepared as described in Example 1, was heated with 3.4 g. of aluminum tri(ethoxide) at 145–155° until the evolution of carbon dioxide had ceased. The crude product was then purified by fractional distillation. 6-methyl-5-hepten-2-one was collected at 54–56° (8 mm.); $n_D^{25}=1.4372$; yield, 197.6 g. (78.4% of theory).

*Example 7*

Dimethyl-vinyl-carbinyl acetoacetate (340 g.) was heated with 3.4 g. of aluminum tri(n-butoxide) at 145–155° until the evolution of gas had ceased. The reaction mixture was purified by fractional distillation. 6-methyl-5-hepten-2-one was collected at 57–59° (10 mm.); $n_D^{25}=1.4372$; yield, 190.0 g. (75.3% of theory).

We claim:

1. A process of making a ketone which comprises heating an ester of the formula

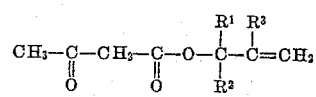

wherein $R^1$ is selected from the group consisting of alkyl and alkenyl radicals, $R^2$ is a lower alkyl radical, and $R^3$ is selected from the group consisting of hydrogen and lower alkyl radicals in the presence of an aluminum tri(lower alkoxide) thereby eliminating carbon dioxide from said ester.

2. A process according to claim 1 wherein the aluminum tri(lower alkoxide) is used in a proportion not less than about 2 millimols per mol of ester.

3. A process of making a ketone which comprises heating a (lower alkyl)-alkyl-vinyl-carbinyl acetoacetate in the presence of an aluminum tri(lower alkoxide) thereby eliminating carbon dioxide from said acetoacetate ester; the aluminum tri(lower alkoxide) being used in a proportion of from about 8 millimols to about 25 millimols per mol of acetoacetate ester, and the alkoxide radicals thereof each containing from two to four carbon atoms.

4. A process according to claim 3 wherein the acetoacetate is a methyl-(lower alkyl)-vinyl-carbinyl acetoacetate.

5. A process of making a ketone which comprises heating a (lower alkyl)-alkenyl-vinyl-carbinyl acetoacetate in the presence of an aluminum tri(lower alkoxide) thereby liberating carbon dioxide; the aluminum tri(lower alkoxide) being used in a proportion of from about 8 millimols to about 25 millimols per mol of acetoacetate ester, and the alkoxide radicals thereof each containing from two to four carbon atoms.

6. A process which comprises heating dimethyl-vinyl-carbinyl acetoacetate in the presence of an aluminum tri(lower alkoxide) thereby eliminating carbon dioxide from said acetoacetate ester and forming 6-methyl-5-hepten-2-one; the aluminum tri(lower alkoxide) being used in a proportion of from about 8 millimols to about 25 millimols per mol of acetoacetate ester, and the alkoxide radicals thereof each containing from two to four carbon atoms.

7. A process according to claim 6 wherein the aluminum tri(lower alkoxide) is aluminum tri(isopropoxide).

8. A process which comprises heating methyl-isobutyl-vinyl-carbinyl acetoacetate in the presence of an aluminum tri(lower alkoxide) thereby eliminating carbon dioxide from said acetoacetate ester and forming 6,8-dimethyl-5-nonen-2-one; the aluminum tri(lower alkoxide) being used in a proportion of from about 8 millimols to about 25 millimols per mol of acetoacetate ester, and the alkoxide radicals thereof each containing from two to four carbon atoms.

9. A process which comprises heating methyl-(4-methyl-3-penten-1-yl)-vinyl-carbinyl acetoacetate in the presence of an aluminum tri(lower alkoxide) thereby eliminating carbon dioxide from said acetoacetate ester and forming 6,10-dimethyl-5,9-hendecadien-2-one; the aluminum tri(lower alkoxide) being used in a proportion of from about 8 millimols to about 25 millimols per mol of acetoacetate ester, and the alkoxide radicals thereof each containing from two to four carbon atoms.

References Cited in the file of this patent

UNITED STATES PATENTS

| | | |
|---|---|---|
| 2,628,250 | Kimel | Feb. 10, 1953 |
| 2,662,920 | Kimel | Dec. 15, 1953 |

FOREIGN PATENTS

| | | |
|---|---|---|
| 695,313 | Great Britain | Aug. 5, 1953 |